Dec. 1, 1964   L. G. TOCCI   3,159,697
BLOW AND COMPRESSION MOLDING ECCENTRICALLY THICK PARISON
Filed July 17, 1962   2 Sheets-Sheet 1
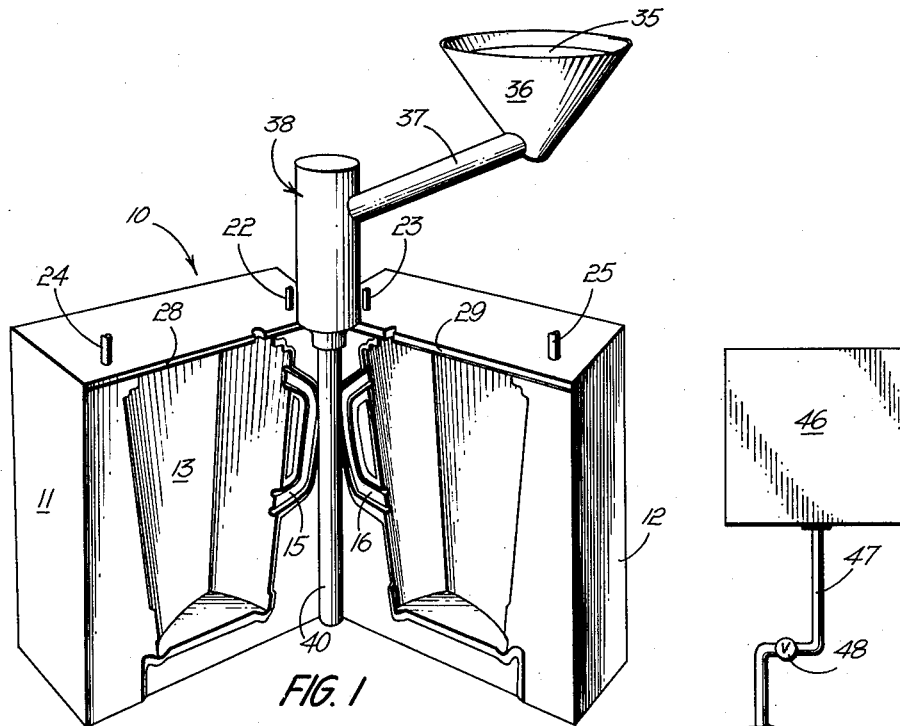
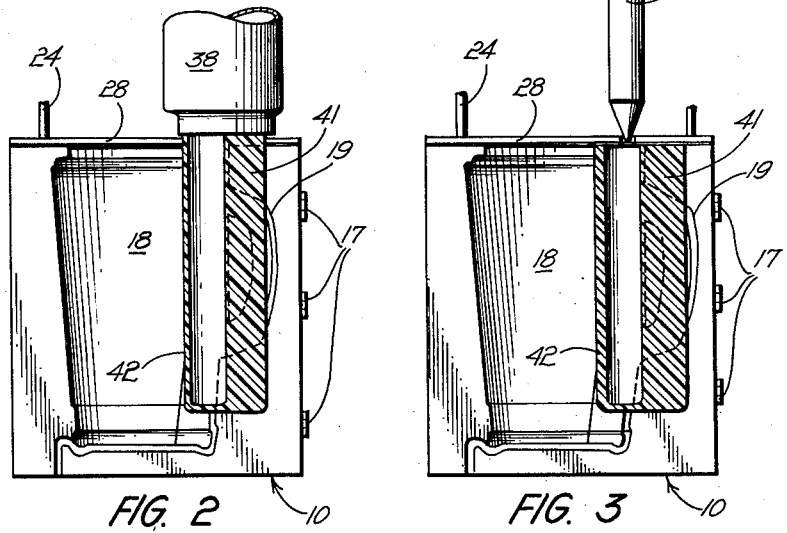
INVENTOR.
LOUIS TOCCI
BY Hofgren, Brady, Wegner,
Allen and Stellman Dec. 1, 1964 L. G. TOCCI 3,159,697
BLOW AND COMPRESSION MOLDING ECCENTRICALLY THICK PARISON
Filed July 17, 1962 2 Sheets-Sheet 2

INVENTOR.
LOUIS TOCCI
BY Hofgren, Brady, Wegner,
Allen and Stellman

United States Patent Office 3,159,697
Patented Dec. 1, 1964

3,159,697
BLOW AND COMPRESSION MOLDING ECCENTRICALLY THICK PARISON
Louis G. Tocci, Leominster, Mass., assignor to Tucker Manufacturing Corp., a Massachusetts corporation
Filed July 17, 1962, Ser. No. 210,387
5 Claims. (Cl. 264—94)

This invention relates to the manufacture of plastic articles by compression and blow molding methods. More particularly this invention relates to the molding of plastic articles, by blow molding and compression molding operations.

It is often desirable to provide an article of manufacture which includes a blow molded portion and a compression molded portion. For example, it is a common practice to provide a blow molded container with a solid handle manufactured by some other molding operation. Accordingly, the container portion and handle portion are molded separately and later joined by suitable adhesives, infusion, or the like. Probably the weakest point in many such articles, especially where the article is a container for liquids and the like with the handle protruding from either a top or side wall of the container, is the juncture of the handle with the remainder of the article. Much stress may be placed on this joint or juncture during use of such a container. Such stress can result in tearing loose of the handle from the container portion, often rendering the container useless for its intended purpose before other portions of the assembly have materially deteriorated.

Additionally, the molding of the container portion and handle portion in separate operations involves separate techniques and separate molding apparatus. Further, the joining of the handle to the molded container portion usually necessitates the use of adhesives or heat fusing equipment and involves an expenditure of man hours.

The present invention eliminates the separate molding operations in the manufacture of articles having blow molded portions and portions moldable by other means, e.g. solid portions moldable by compression molding. The present invention further eliminates the step of joining a separately molded solid portion, such as a handle, to a blow molded article, e.g. a container.

It is an object of this invention to produce articles having a blow molded portion and a compression molded portion integral therewith.

It is another object of this invention to provide a new and useful process for making such articles of manufacture.

Still another object of this invention is to provide a process for producing containers having compression molded handle portions and blow molded container portions having substantially homogeneous continuity of material throughout the handle and container portions and interconnection of handle and container portions.

Another object is to provide a method for forming such articles wherein a parison having a thick wall may be converted to a handled container by compression molding the thick wall to form a solid handle and blow molding the remainder of the parison to form a container portion.

A further object is to provide a method wherein the plastic material to be molded is formed into a parison having a thick wall, the parison is placed between female mold halves having opposing and cooperating compression molding cavities interconnected with blow molding cavities so that the thick wall is between the compression molding cavities and the remainder of the parison is between the blow molding cavities, closing the mold halves on each other to effect the compression molding of the thick wall, blow molding the remainder of the parison by internal pressure of compressed air, hardening the resulting molded form and separating the hardened molded article from the mold, which article has the compression molded portion in strong integral attachment with the blow molded portion.

Other objects of this invention will be apparent to those in the art from the following descriptions and the drawings in which:

FIG. 1 illustrates a molding apparatus including an embodiment of the mold with the mold halves separated, in which an article can be molded in accordance herewith;

FIG. 2 shows a side view of the mold of FIG. 1 with the mold halves closed against each other;

FIG. 3 is a side view of the mold as shown in FIGS. 1 and 2 in position for blow molding;

Figure 4:
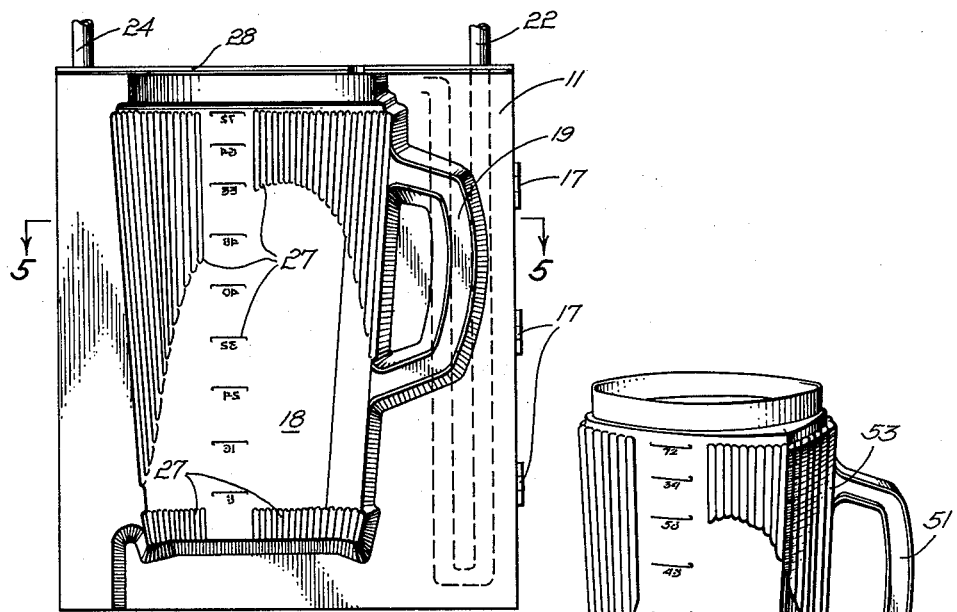
FIG. 4 is a detailed view into one mold half of the mold illustrated in FIGS. 1 through 3.

Referring first to FIGS. 1 through 5, there is shown a molding system in which molded articles can be produced in accordance herewith. A mold, shown generally by reference numeral 10, is constructed of two mold halves 11 and 12 which are connected together in pivotal toward and away from each other by means of hinges shown generally at reference numeral 17. Mold halves 11 and 12 include blow mold cavities 13 and 14 and compression mold cavities 15 and 16. Cavities 13 and 15 are interconnected, as are cavities 14 and 16. With the mold in closed position (FIGS. 2 and 3) blow mold cavities 13 and 14 form a blow mold chamber 18 and compression mold cavities 15 and 16 form a compression mold chamber 19. Heat exchange tubes, e.g. as shown at reference numeral 26, jacket each of the mold cavities. Cooling or heating media may be circulated through the heat exchange tubes by charging to inlets 22 and 23 for cooling or heating the mold cavities. The heat exchange medium is withdrawn through outlets 24 and 25 and may be recirculated to the inlets, e.g. after being restored to the proper heat exchange temperature.

In each of the mold cavities, configurations or designs on the interior surfaces of the mold may be provided, such as are shown generally by reference numeral 27 with respect to cavity 13.

Top plates 28 and 29 are provided on the mold halves and define the upper limits of mold cavities 13 and 14 and mold chamber 18. An orifice or opening 30, formed by cooperating notches in the joined top plates 28 and 29, is provided for access to mold chamber 28 with the mold halves in closed position for purposes which will be more apparent hereinbelow.

In association with the cooperating mold halves, there is provided an extruder shown generally at 38 which is fed with molten or softened plastic material, shown generally at 35, from hopper 36 by way of screw conveyor 37. The hopper, screw conveyor and extruder are conventional items with no modification in their basic structures being necessary. Extruder 38 is equipped with a die capable of producing a parison having a thick wall. The parison is shown generally by reference numeral 40. The configuration of the die will be obvious to those in the art.

In the manufacture of molded articles, and especially with reference to FIGS. 1 through 3, a polyethylene parison 40 having a thick wall is formed by extruder 38 and lowered between the separated mold halves as shown in FIG. 1. The mold halves are then closed (FIG. 2) so that the thick wall portion 41 of parison 40 is clamped and compression molded by mold cavities 15 and 16 which form mold chamber 19. During closing of mold halves 11 and 12, the mold cavities are maintained at about 60° to 90° F. by circulation of cold fluids through the heat exchange tubes.

After the mold halves are closed, extruder 38 is removed and parison 40, which is pinched between top plates 28 and 29, remains suspended with opening 30 communicating from the exterior of the mold into parison 40. Air injection nozzle 45, supplied with air from a pressurized air source 46, e.g. a pressure tank or compressor outlet, through air line 47, is placed in opening 30 and valve 48 is opened to permit flow of air through nozzle 45 and into parison 40. The internal pressure created by the flow of air into parison 40 causes the thinner wall portion 42 of parison 40 to expand and be pressed against the inner walls of blow molding cavity 18, whereupon valve 48 is closed and nozzle 45 is removed from opening 30. Sufficient escape of air within chamber 18 is provided through the juncture of mold halves 11 and 12 to permit blowing of the parison within the blow mold chamber. During the blow molding operation, the temperature is maintained at about 60° to 90° F.

After removal of nozzle 45, the molded form is cooled by circulating cooling water through the heat exchange tubes until the plastic form solidifies. The mold halves are then separated and the molded plastic container is removed. The container may then be trimmed to remove superfluous material, especially at the top opening of the container, adjacent the handle of the container, and along the "seam" formed by the line of juncture of the two mold halves.

Figure 6:
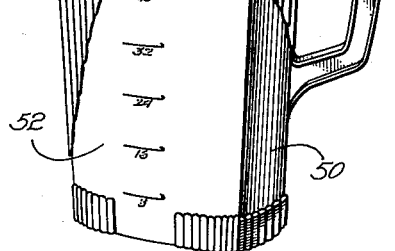
FIG. 6 shows an embodiment of an article of this invention.
Figure 5:
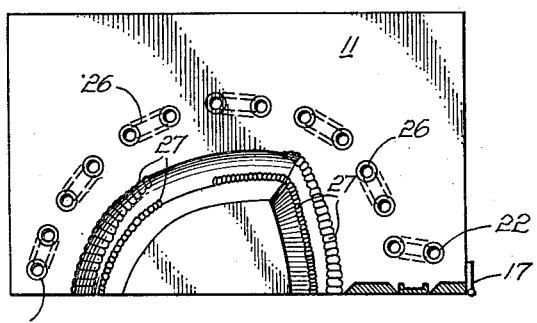
FIG. 5 is a horizontal section of the mold half of FIG. 4 along line 5—5 of FIG. 4.

FIG. 6 illustrates the finished molded article, i.e. the container indicated generally by reference numeral 50. Container 50 includes compression molded handle portion 51 which has a cross-sectional "I" configuration for strength. The handle is connate with the blow molded container portion 52 which has designs or configurations corresponding to those on the surface of the blow mold chamber 18. The interconnection between handle 51 and container portion 52, shown generally by reference numeral 53, includes a homogeneous transition of plastic material continuous through the interconnection of compression molded handle 51 and blow molded container portion 52.

Although the present invention has been described above with respect to the formation of a polyethylene article from a polyethylene parison, other moldable materials may, of course, be used. The moldable materials are those which have a plastic state and are extrudable or otherwise formable, e.g. by cast molding, into a parison. The moldable materials are preferably non-reactive but, with recent developments in extrusion methods adaptable to forming parisons from reactive materials, such reactive materials are also intended for use in accordance herewith. Commonly used blow molding compositions which are advantageously usable herein, include rubber, pyroxylin, poly olefins such as high density polyethylene and polypropylene, and the like. Other compression and blow moldable compositions include, for example, the following, with trade designations indicated in parenthesis after many of the compositions: molding methylmethacrylate (e.g. Lucite, Plexiglas, etc.), methylmethacrylate-styrene copolymers (e.g. Zerlon), modified acrylic molding compounds, ethylcellulose molding compounds (e.g. Ethocel), molding cellulose acetate, cellulose propionate molding compound (e.g. Forticel, Tenite propionate, etc.), cellulose acetate butyrate, chlorinated polyether (e.g. Penton), glass fiber filled nylon molding compounds, nylon Type 6 and Type 6/6, polyethylene including high, low and medium density polyethylene, polypropylene, polychlorotrifluoroethylene, fluorocarbon resins, polystyrene molding compounds, styrene-acrylonitrile copolymers, acrylonitrile-butadiene-styrene terpolymers and blends, flexible vinyl butyral molding compounds, flexible vinyl chloride and vinyl-chloride-acetate molding compounds, vinylidene chloride molding compounds, vinyl-formal molding compounds (e.g. Formvar), polyvinylidene fluoride (e.g. Kynar), etc. Other suitable materials will be apparent to those in the art.

In the above example the softened parison was extruded directly in position between the two separated mold halves with the thick wall portion between the compression mold cavities and the thin wall portion between the blow mold cavities. Of course, the parison may be formed out of association with the molding apparatus, e.g. by extrusion, casting or the like and may then be resoftened and inserted between the mold halves.

In the compression molding phase of the present invention, the usual compression molding temperatures and pressures may be used. Compression molding temperatures are well known for particular moldable materials and the present invention is applicable to all compression molding temperature ranges.

As illustrated above, after the mold is closed to compression mold a portion of the article, a pressure fluid is introduced into a blow moldable portion of the parison. Any pressure fluid which does not react to destroy advantageous properties of the parison and which is capable of existing as a fluid at the desired blowing temperatures, may be used, including hot air, gas, steam or water.

Further, although the mold halves illustrated in the drawings essentially constitute a lever type press wherein the mold halves are pivoted together on a common fulcrum, other mold press arrangements such as screw type presses, toggle type presses, or any of the various hydraulic presses, may be used. The hydraulic type presses may be preferred for mass production of molded articles.

In the present process, the normal blow molding temperatures for molding given moldable materials may be used. Such temperatures are well known to those in the art.

After the blow molding operation, the molded form is hardened, e.g. by cooling or curing with heat. More usually, the hardening is effected by cooling and rapid cooling of the mold is required where high production rates are desirable so that the mold may readily be freed for reuse. Thus, it is preferred that the mold cavities be constructed of materials having high heat transfer co-efficients. Such materials include alloys of beryllium, copper and aluminum.

The foregoing detailed description has been given for clearness of understanding only and no unnecessary limitation should be understood therefrom. Additional modifications will be obvious to those skilled in the art.

I claim:

1. A method for molding plastic articles from a parison, which method comprises generally concurrently blow molding a thin wall portion of the parison and compression molding a thick wall portion of the parison beyond the largest diameter of the thin wall portion being blow molded.

2. The method of claim 1 wherein said parison is a polyethylene parison.

3. A method for molding plastic containers from a parison, which method comprises compression molding a thick portion of the wall of the parison to form the entire handle of said container, said thick wall portion being exterior from the wall surfaces defining the inner cavity of said parison, and blow molding the thinner walled remainder of said parison while attached to the molded handle secured in the compression mold.

4. A molding process for making a handled container which comprises inserting a softened parison having a thick wall between female mold halves, each of said mold halves including opposing and cooperating compression mold cavities of handle configuration interconnected with blow mold cavities of container wall configuration, the thick wall of said parison being positioned between the compression mold cavities and the remainder of the parison being positioned between the blow mold cavities, closing the mold halves on each other to effect compression molding of the thick wall by said compression mold cavities, introducing pressure fluid into said parison to effect blow molding of the remainder of the parison within the limits of said blow mold cavities, cooling the resulting molded form until hardened, and separating the hardened resulting molded handled container from the mold.

5. The process of claim 4 wherein the softened parison is formed by extruding a plastic material in the form of said parison.

References Cited by the Examiner

UNITED STATES PATENTS

| | | | |
|---|---|---|---|
| Re. 3,116 | 9/68 | Atterbury | 65—148 |
| 182,242 | 9/76 | Stoehr | 65—46 |
| 2,349,177 | 5/44 | Kopitke | 18—55 |
| 2,632,202 | 3/53 | Haines | 18—5 |
| 2,810,160 | 10/57 | Bottleman | 18—42 |
| 2,899,709 | 8/59 | Steiner | 18—14 XR |
| 2,951,264 | 9/60 | Bailey | 18—55 |
| 2,967,330 | 1/61 | Tommarchi | 18—55 |
| 3,019,481 | 2/62 | Negoro | 18—14 XR |
| 3,020,595 | 2/62 | Szajna | 18—42 |
| 3,050,773 | 8/62 | Hagen | 18—14 XR |

FOREIGN PATENTS 752,637  7/56  Great Britain.

ALEXANDER H. BRODMERKEL, *Primary Examiner.*

MICHAEL V. BRINDISI, *Examiner.*